(12) United States Patent
Kimura

(10) Patent No.: US 7,750,512 B2
(45) Date of Patent: Jul. 6, 2010

(54) IMAGE FORMING APPARATUS

(75) Inventor: Masahiko Kimura, Gifu-ken (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 76 days.

(21) Appl. No.: 12/053,159

(22) Filed: Mar. 21, 2008

(65) Prior Publication Data

US 2008/0238209 A1    Oct. 2, 2008

(30) Foreign Application Priority Data

Mar. 29, 2007    (JP)    ............... 2007-089638

(51) Int. Cl.
H01H 9/54    (2006.01)
(52) U.S. Cl. .................................... 307/140
(58) Field of Classification Search ................. 307/140, 307/44
See application file for complete search history.

(56) References Cited

U.S. PATENT DOCUMENTS

2006/0214512 A1 *  9/2006  Iwata ........................ 307/44

FOREIGN PATENT DOCUMENTS

JP    H11-177731 A    7/1999
JP    H11-289419 A    10/1999

* cited by examiner

Primary Examiner—Robert L. Deberadinis
(74) Attorney, Agent, or Firm—Baker Botts L.L.P.

(57) ABSTRACT

An image forming apparatus according to an aspect of the invention is operable in a first mode in which a first unit group comprising at least one of a plurality of functional units is activated and a second mode in which a second unit group comprising at least one of the plurality of functional units is activated. In the first mode, a control unit is operable to: activate a first power source circuit; input a first voltage to a third power source circuit; and supply an operation voltage converted by the third power source circuit to the first unit group. In the second mode, the control unit is operable to: activate a second power source circuit and deactivate the first power source circuit; and supply a second voltage output from the second power source circuit to the second unit group without intervention of the third power source circuit.

17 Claims, 11 Drawing Sheets

IMAGE FORMING APPARATUS

CROSS-REFERENCE TO RELATED APPLICATIONS

This application is based upon and claims the benefit of priority from Japanese Patent Application No. 2007-089638, filed on Mar. 29, 2007, the entire contents of which are incorporated herein by reference.

TECHNICAL FIELD

One aspect of the present invention relates to an image forming apparatus, and more particularly to an image forming apparatus capable of reducing power consumed in a low power consumption mode by minimizing power consumption of a power source circuit.

BACKGROUND

A related-art image forming apparatus has a plurality of functions. JP-A-11-177731 (especially, paragraph [0066]) discloses an image forming apparatus has a normal power mode in which a plurality of functions are available and a low power consumption mode in which power consumption is reduced by deactivating the functions when the functions are not utilized. In the normal power mode, power is supplied to the entire apparatus from a main power source. In the low power consumption mode, power is supplied from the main power source to only a detection circuit for detecting an external trigger for restoring the apparatus to the normal power mode, such as a circuit access and an operation. When the low power consumption mode is selected, the power supplied to the entire apparatus is reduced to the power supplied solely to the detection circuit. Hence, the power consumed by the apparatus is decreased.

However, in the above image forming apparatus, power is supplied from the main power source in any of the modes; namely, the low power consumption mode and the normal power mode. The main power source generates large electric power used for operating the entire apparatus, and therefore the main power source itself consumes power. When the low power consumption mode is selected, only the detection circuit operates, and the other circuits are deactivated. However, power is supplied to the detection circuit by the main power source, and hence power consumption of the main power source remains the same. Therefore, even in the low power consumption mode, the power consumption may not sufficiently reduced.

SUMMARY

One aspect of the present invention has been conceived in accordance with the above circumstances and to provide an image forming apparatus capable of reducing power consumed in a low power consumption mode by minimizing power consumption of a power source circuit that supplies power to a functional unit which operates in an operating mode while a functional unit operating in a low power consumption mode is continually kept operating.

According to an aspect of the invention, there is provided an image forming apparatus comprising: a board comprising a plurality of functional units; a first power source circuit configured to output a first voltage; a second power source circuit configured to output a second voltage which is lower than the first voltage; a power switching unit configured to selectively activate the first power source circuit and the second power source circuit, individually; a third power source circuit mounted on the board and configured to convert the first voltage input from the first power source circuit into operation voltages to operate respective functional units; a mode switching unit configured to select one of power modes, the power modes including a first mode in which a first unit group comprising at least one of the plurality of functional units is activated and a second mode in which a second unit group comprising at least one of the plurality of functional units is activated; and a control unit, wherein, in the first mode, the control unit is operable to: control the power switching unit to activate the first power source circuit; input the first voltage to the third power source circuit; and supply the operation voltage converted by the third power source circuit to the first unit group, and wherein, in the second mode, the control unit is operable to: control the power switching unit to activate the second power source circuit and to deactivate the first power source circuit; and supply the second voltage output from the second power source circuit to the second unit group without intervention of the third power source circuit.

DESCRIPTION

Figure 1:
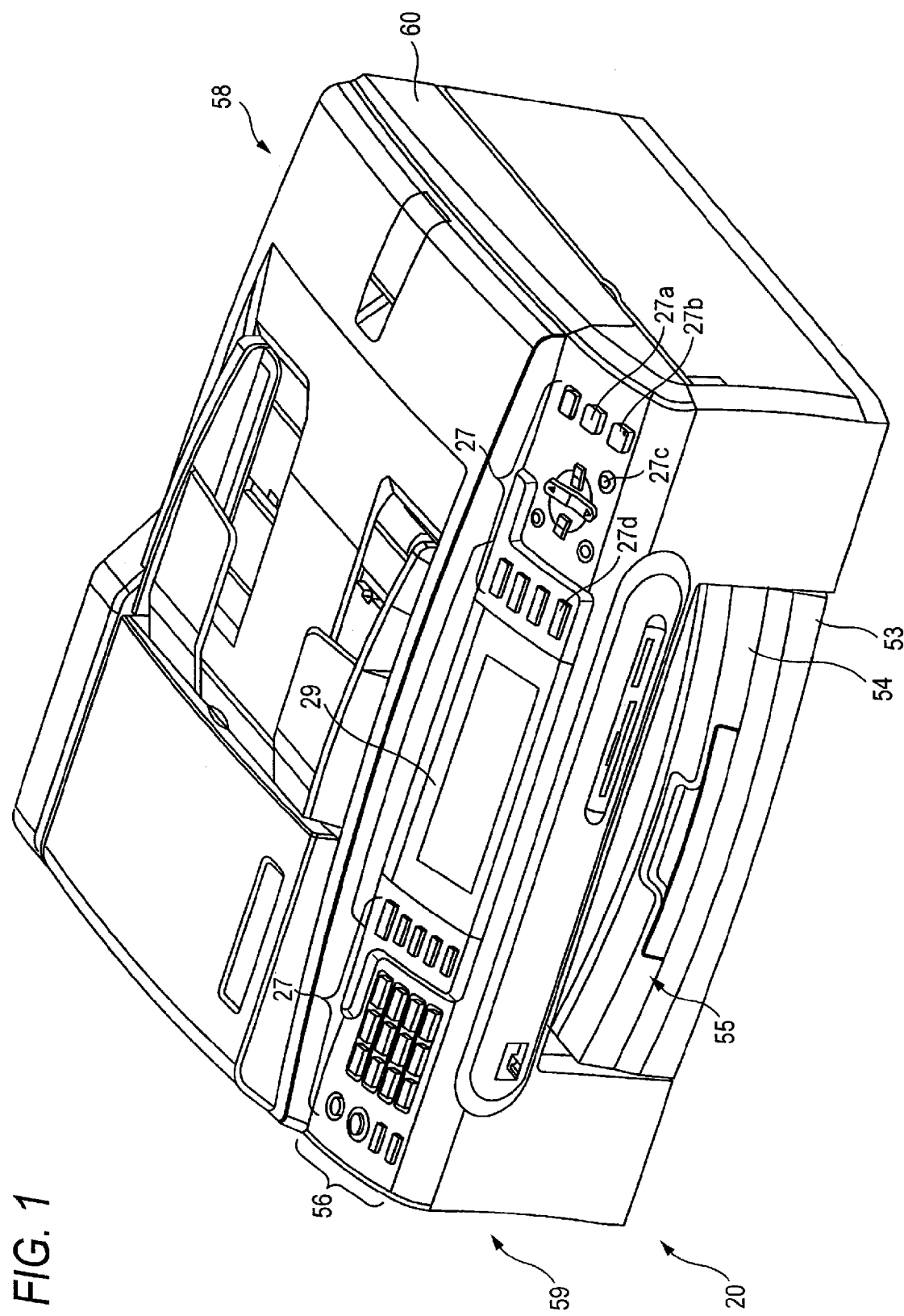
FIG. 1 is a perspective view showing an external configuration of a Multi Function Peripheral Device (hereinafter abbreviated as an "MFP") of an embodiment of the present invention.

Embodiments of the present invention will be described hereunder with reference to the accompanying drawings. FIG. 1 is a perspective view showing an external configuration of a multifunction peripheral device (hereinafter abbreviated as an "MFP") 20 according to an embodiment of the present invention. The MFP 20 has various functions, such as a printer function, a scanner function, and a copier function.

An opening 55 is provided in the front of a main unit of the MFP 20, and the space inside of the opening is separated into up and lower portions. A sheet feeding cassette 53 capable of holding a stack of recording sheets is inserted in the lower portion of the opening 55. The sheet feeding cassette 53 can hold recording sheets cut to A4 size, and the like. An upper portion of the opening 55 serves as a sheet discharging portion 54 to which recorded recording sheets are discharged.

An inkjet printer 59 configured to record data on a recording sheet set at a predetermined sheet feeding position (not shown) according to an instruction from a CPU 21 (see FIG. 2) is built into the main unit. A printer 59 includes a recording sheet conveyance motor (not shown) configured to convey a recording sheet; a print head (not shown) configured to eject ink toward a recording sheet; and a print carriage motor (not shown) configured to move a print carriage (not shown) bearing the print head.

A scanner 60 configured to read a document at the time of performance of a scanner function or a copier function is disposed in the upper portion of the opening 55. The scanner 60 includes a document cover body 58; a mount glass plate (not shown) configured to be placed thereon a document; a scanner carriage (not shown) bearing a document reading sensor (not shown) that reads a document on a per-line basis; and a scanner carriage motor (not shown) configured to reciprocally move the scanner carriage (not shown) along one direction.

The mount glass plate (not shown) is located below a document cover unit 58. When a document is read, the document cover unit 58 is opened up; the document is mounted on the mount glass plate; and the document is fixed by closing the document cover unit 58.

When a document read key 27d of a operation unit 27 is depressed, an image is scanned one line at a time from one end to the other end of the document by means of a scanner carriage (not shown) disposed below the mount glass plate (not shown). When the document is read across a line, the scanner carriage (not shown) is carried to the other end of the document for one line by means of a scanner carriage motor (not shown), whereupon an image of the next one line is read. Reading and carrying are repeated, whereby an image of the entire document is read. The thus-read image data are stored in a predetermined storage area of RAM 25 (see FIG. 2) to be described later. For instance, a CIS (Contact Image Sensor) or a CCD (Charge-Coupled Device) is used for a document reading sensor (not shown) of the scanner 60.

Figure 2:
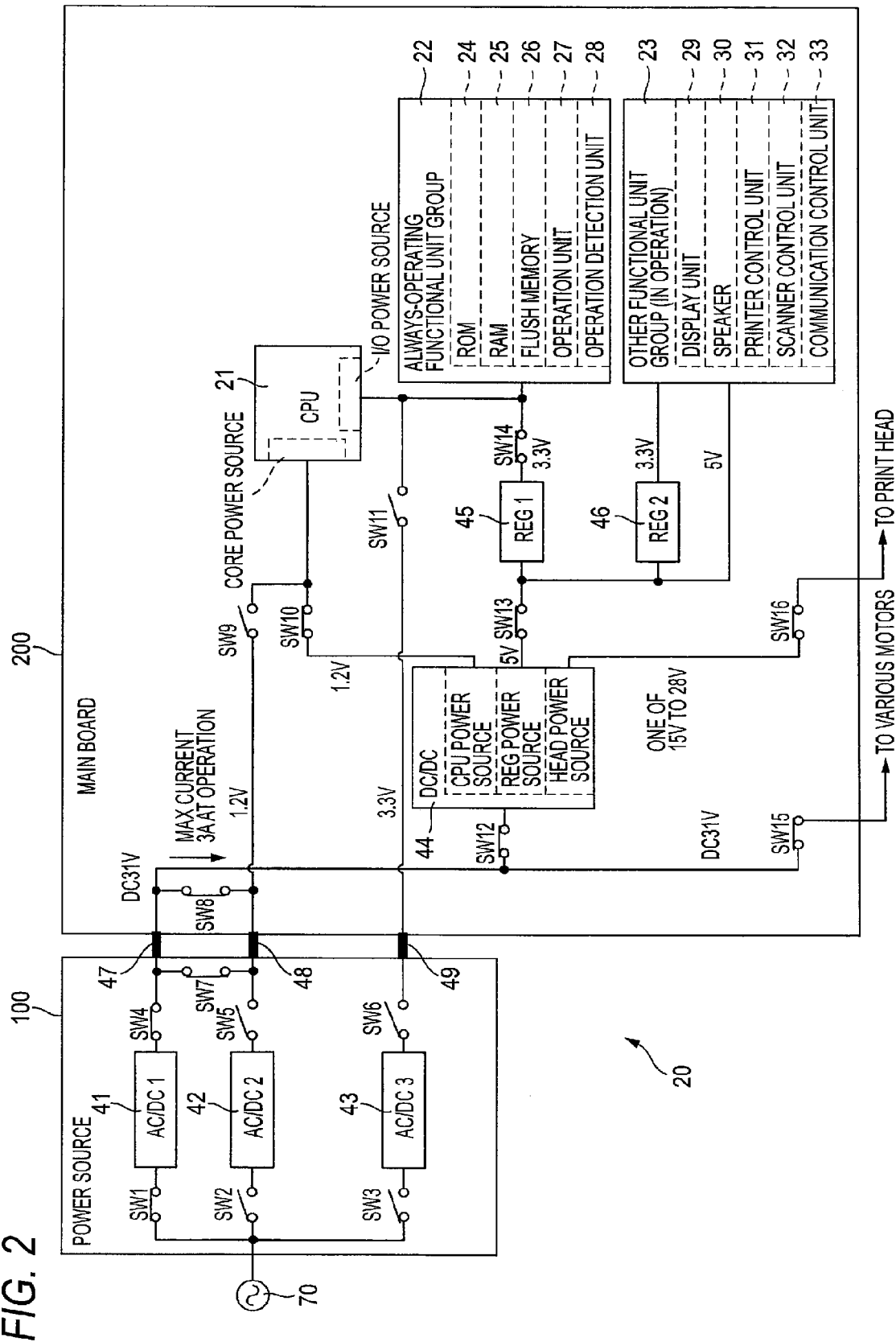
FIG. 2 is a block diagram schematically showing an electrical configuration of the MFP and a power supply channel in an operating mode.

A horizontally-oriented control panel 56 is provided in a front portion of the document cover unit 58 and includes the operation unit 27, a display unit 29, and a speaker 30 (see FIG. 2). The operation unit 27 includes a low consumption mode select key 27a for shifting the MFP 20 from an operating mode to a low consumption mode; an operating mode select key 27b for shifting the MFP 20 from the low consumption mode to the operating mode; an enter key 27c for determining specifics of a setting displayed on the display unit 29; and a document read key 27d for reading a document by means of a scanner 60. By means of depressing various keys of the operation unit 27, the user can perform operation for activating or deactivating the main power or operation for switching among various functions, such as a printer function, a scanner function, and a copier function.

The display unit 29 displays a menu, operation procedures, and the status of processing being executed; and is made up of a display device; for example, a liquid-crystal display. Since information corresponding to depression of the operation unit 27 is displayed, a user can ascertain image data to be recorded by the printer 59 and various pieces of information about the MFP 20. A speaker 30 (see FIG. 2) sends to the user an operating sound of the operation unit 27 and a warning sound resulting from occurrence of an error.

An electrical configuration of the MFP 20 will now be described by reference to FIG. 2. FIG. 2 is a block diagram schematically showing the electrical configuration of the MFP 20 and a supply channel of electric power input to the electrical configuration.

The MFP 20 includes a power source 100 that generates electric power for effecting the operation of the MFP 20; a main board 200 on which various control units for controlling the MFP 20 are mounted; and three connecting lines 47 to 49 for inputting (supplying) the electric power generated by the power source 100 to the main board 200.

The MFP 20 has an operating mode for effecting operations of all functional units 24 to 33 of the main board 200 of the MFP 20 and a low consumption mode for effecting operations of only some of the functional units of the main board 200 of the MFP 20; namely, the functional units 24 to 28, in which the electric power consumed by the entire MFP 20 is reduced. The user can toggle the MFP 20 between the operating mode and the low consumption mode by depressing the low consumption mode select key 27a or the operating mode select key 27b of the operation unit 27 (see FIG. 1). Specifically, when the user depresses the low consumption mode select key 27a while the MFP 20 is in the operating mode, the MFP 20 shifts to the low consumption mode where power consumption is diminished. Further, when the user depresses the operating mode select key 27b while the MFP 20 is in the low consumption mode, the MFP 20 shifts to the operating mode where all of the functional units of the main board 200 are available.

When the MFP 20 is in the operating mode, electric power is supplied to all of the functional units 24 to 33 of the main board 200, various motors, and a print head in the MFP 20. However, when the MFP 20 is in the low consumption mode, electric power is supplied only to the CPU 21 to be described later and a functional unit group 22 that is continually kept operating (hereinafter called a "always-operating unit group 22"). Hence, the power consumed by the overall MFP 20 can be curtailed. Incidentally, CPU 21 also serves as a functional unit mounted on the main board 200. Therefore, the unit group operating in the low consumption mode contains the CPU 21 and the always-operating functional unit group 22 (functional units 24-28), and the unit group operating in the operating mode contains the CPU 21, the always-operating functional unit group 22, and other functional unit group 23 (functional units 29-33).

The power source 100 mainly includes a first AC-DC converter (AC-DC 1 in the drawings) 41 that receives as an input a 100-volt AC voltage (hereinafter called an "AC voltage") 70 supplied from commercial power and that produces an output of 31-volt AC voltage (DC 31 volts); a second AC-DC converter (AC-DC 2 in the drawings) 42 that receives as an input the AC voltage 70 and that produces an output of 1.2-volt DC voltage (DC 1.2 volts); a third AC-DC converter (AC-DC 3 in the drawings) 43 that receives as an input the AC voltage 70 and that produces an output of 3.3-volt DC voltage (DC 3.3 volts); switches SW1 through SW3 for inputting the AC voltage 70 individually to the AC-DC converters 41 to 43; switches SW4 through SW6 for respectively outputting to the main board 20 voltages output from the respective AC-DC converters 41 to 43; and a switch SW7 for inputting the DC 31 volts output from the first AC-DC converter 41 to the main board 200 by way of the first connecting line 47 and the second connecting line 48.

The switches SW1 through SW7 are connected to the CPU 21 of the main board 200 by way of respective signal lines (not shown) and configured so as to be toggled between on and off (an open state and a closed state) by means of switching signals I through V (see FIGS. 6 through 10) output from the CPU 21.

Specifically, the CPU 21 can individually control activation or deactivation (opening or closing) of the respective switches SW1 through SW3 by outputting switch signals II and V (see FIGS. 7 and 10) individually to the respective switches SW1 through SW3. Since the AC voltage 70 can be input to the respective AC-DC converters 41 through 43 individually, whether or not to activate each of the AC-DC converters 41 through 43 can be controlled. Moreover, whether or not to supply voltages output from the respective AC-DC converters 41 through 43 to the main board 200 can be controlled by means of outputting the switch signals I through V (see FIGS. 6 through 10) individually to the respective switches SW1 through SW7.

The first AC-DC converter 41 is a voltage converter that receives as an input the AC voltage 70 and that outputs the DC 31 volts. The first AC-DC converter 41 is a voltage converter that outputs high electric power for effecting the operation of the entire MFP 20 and consumes large amounts of electric power during voltage conversion.

One end of the switch SW1 is connected to an input terminal of the first AC-DC converter 41 (AC-DC 1 in the drawings), and the AC voltage 70 is connected to the other end of the switch SW1. One end of the switch SW4 is connected to an output terminal of the first AC-DC converter 41, and one end of the switch SW7 and one end of the first connecting line 47 are connected to the other end of the switch SW4. One end of the switch SW8 of the main board 200, one end of the switch SW12 of the main board 200, and one end of the switch SW15 of the main board 200 are connected to the other end of the first connecting line 47, respectively. The first connecting line 47 is a connecting line for inputting to the main board 200 the DC 31 volts output from the first AC-DC converter 41.

When the switch SW1 is turned on by the CPU 21 of the main board 200, the AC voltage 70 is input to the first AC-DC converter 41 (AC-DC 1 in the drawings), and the DC 31 volts are output from the output terminal of the AC-DC converter 41. When the switch SW4 is turned on by the CPU 21, the DC 31 volts output from the first AC-DC converter 41 are input to the main board 200 by way of the first connecting line 47.

The second AC-DC converter 42 is a voltage converter that receives as an input the AC voltage 70 and outputs DC 1.2 volts. When the MFP 20 is in the low consumption mode, the DC 1.2 volts output from the second AC-DC converter 42 are input to a core power source of the CPU 21 of the main board 200. The second AC-DC converter 42 is a voltage converter that inputs a voltage solely to the core power source of the CPU 21 when the MFP is in the low consumption mode; and is configured so as to become much smaller than the first AC-DC converter 41 and consumes a very small amount of electric power during voltage conversion.

The core power source of the CPU 21 is a voltage input unit for rendering various circuits provided in the CPU 21 operable. When a predetermined voltage (e.g., DC 1.2 volts) is input to the core power source of the CPU 21, the circuits in the CPU 21 become operable, and the CPU 21 comes into being able to effect arithmetic operation.

One end of the switch SW2 is connected to an input terminal of the second AC-DC converter 42, and the AC voltage 70 is connected to the other end of the switch SW2. One end of the switch SW5 is connected to an output terminal of the second AC-DC converter 42, and the other end of the switch SW7 and one end of the second connecting line 48 are connected to the other end of the switch SW5. The other end of the switch SW8 of the main board 200 and one end of the switch SW9 of the main board 200 are connected to the other end of the second connecting line 48. One end of the switch SW10 of the main board 200 and the core power source of the CPU 21 of the main board 200 are connected to the other end of the switch SW9 of the main board 200.

The second connecting line 48 is a connecting line for inputting to the main board 200 the DC 31 volts output from the first AC-DC converter 41 or the DC 1.2 volts output from the second AC-DC converter 42.

When the CPU 21 of the main board 200 turns on the switch SW2, the AC voltage 70 is input to the second AC-DC converter 42, and DC 1.2 volts are output from the output terminal of the second AC-DC converter 42. When the CPU 21 turns on the switch SW5 and turns off the switch SW7, the DC 1.2 volts output from the second AC-DC 42 are input to the main board 200 by way of the second connecting line 48. Moreover, when the switch SW9 is turned on by the CPU 21, the DC 1.2 volts are input to the power core of the CPU 21.

Either the DC 1.2 volts output from the second AC-DC converter 42 or the DC 1.2 volts output from a CPU power source of a DC-DC converter (DC-DC in the drawings) 44 mounted on the main board 200 to be described later (when the switch SW10 is in the ON position), or both, are input to the core power source of the CPU 21.

In the meantime, when the switches SW5 and SW9 are held in the OFF position and the switches SW4, SW7, and SW8 are held in the ON position by means of the CPU 21, the DC 31 volts output from the first AC-DC converter 41 are input to the main board 200 by way of the first connecting line 47 and the second connecting line 48. As mentioned above, as a result of the DC 31 volts output from the first AC-DC converter 41 being input to the main board 200 by way of the two connecting lines 47 and 48, even when either of the connecting lines comes into a failure, the DC 31 volts can be input to the main board 200 by means of the remaining connecting line. Accordingly, the respective functional units of the main board 200 can be operated stably. Specifically, a fail-safe function can be performed.

The third AC-DC converter 43 is a voltage converter that receives the AC voltage 70 and outputs the DC 3.3 volts. When the MFP 20 is in the low consumption mode, DC 3.3 volts output from the third A/C converter 43 are input to an input terminal of an I/O power source of the CPU 21 of the main board 200 and the always-operating functional unit group 22 mounted on the main board 200. The third AC-DC converter is a voltage converter that, when the MFP is in the low consumption mode, inputs a voltage solely to the input terminal of the I/O power source of the CPU 21 and the always-operating functional unit group 22. Hence, the third AC-DC converter is configured so as to become smaller than the first AC-DC converter 41, and power consumed during voltage conversion is small.

The I/O power source of the CPU 21 is a voltage input portion that enables inputting and outputting of signals to and from the respective functional units 24 to 33 and the switches SW1 to SW16 connected to the CPU 21 by way of various bus lines (not shown) and signal lines (not shown). When a predetermined voltage (e.g., DC 3.3 volts) is input to the I/O power source of the CPU 21, the CPU 21 can output the switch signals I to V to the respective functional units 24 to 33 and the switches SW1 to SW16 connected to the CPU 21 by way of the bus lines and the signal lines and can conversely input to the CPU 21a signal output thereto.

One end of the switch SW3 is connected to an input terminal of the third AC-DC converter 43, and the AC voltage 70 is connected to the other end of the switch SW3. One end of the switch SW6 is connected to an output terminal of the third AC-DC converter 43, and one end of the third connecting line 49 is connected to the other end of the switch SW6. One end of the switch SW11 of the main board 200 is connected to the other end of the third connecting line 49. One end of the I/O power source of the CPU 21 of the main board 200, one end of the always-operating functional unit group 22 of the main board 200, and one end of the switch SW14 are connected to the other end of the switch SW11.

The third connecting line 49 is a connecting line for inputting the DC 3.3 volts output from the third AC-DC converter 43 to the I/O power source of the CPU 21 of the main board 200 and the always-operating functional unit group 22 of the main board 200.

When the switch SW3 is turned on by the CPU 21 of the main board 200, the AC voltage 70 is input to the third AC-DC converter 43, and DC 3.3 volts are output from the output terminal of the third AC-DC converter 43. When the switch SW6 is turned on by the CPU 21, DC 3.3 volts output from the third AC-DC converter 43 are input to the main board 200 by way of the third connecting line 49. Moreover, when the switch SW11 is turned on by the CPU 21, DC 3.3 volts are input to the I/O power source of the CPU 21 and the always-operating functional unit group 22.

Either DC 3.3 volts output from the third AC-DC converter 43 or DC 3.3 volts output from a first regulator (REG 1 in the drawings) 45 of the main board 200 to be described later (when the switch SW14 is in the ON position), or both, are input to the I/O power source of the CPU 21 and the always-operating functional unit group 22.

The main board 200 primarily includes the CPU 21; the always-operating functional unit group 22; other functional unit group 23 that is not operated in the low consumption mode; a DC-DC converter 44 that generates a plurality of d.c. voltages by receiving as an input the DC 31 volts output from the first AC-DC converter 41 of the power source 100 and that outputs the d.c. voltages individually; the first regulator 45 that receives, as an input, one of the d.c. voltages output from the DC-DC converter 44 and that supplies electric power to the CPU 21 and the always-operating functional unit group 22; a second regulator (REG 2 in the drawings) 46 that receives, as an input, one of the d.c. voltages output from the DC-DC converter 44 and that supplies electric power to the other functional unit group 23; and switches SW8 to SW16 that controls whether or not to input various voltages received from the power source 100 to the main board and whether or not to supply voltages generated in the main board 200 to respective destinations.

The CPU 21, the always-operating functional unit group 22, and the other functional unit group 23 are connected to each other by way of an unillustrated bus line. The CPU 21 controls respective units connected to the bus line (not shown) in accordance with fixed values or programs stored in ROM 24 and RAM 25 of the always-operating functional unit group 22, control of various functions belonging to the MFP 20 like a printer function, a scanner function, and a copier function, and various signals exchanged by way of a communication control unit 33. The CPU 21 operates when the DC 1.2 volts are input to the input terminal of the core power source and when DC 3.3 volts are input to the input terminal of the I/O power source.

The CPU 21 is connected to the respective switches SW1 to SW7 of the power source 100 and the switches SW8 to SW16 of the main board 200, by way of respective signal lines (not shown). The respective switches SW1 through SW16 are configured so as to be toggled on or off by means of the switch signals I to V (see FIGS. 6 through 10) output from the CPU 21. Specifically, the CPU 21 can individually control activation or deactivation (opening or closing) of the respective switches SW1 through SW16 by outputting the switch signals I through V (see FIGS. 6 through 10) to the switches SW1 through SW7 of the power source 100 and the respective switches SW8 through SW16 of the main board 200, respectively.

The always-operating functional unit group 22 operates at all times regardless of the operating mode or the low consumption mode. The functional unit group 22 is built from the ROM 24, the RAM 25, flash memory 26, the operation unit 27, and an operation detection unit 28. When DC 3.3 volts are input to the always-operating functional unit group 22, the functional units 24 through 28 operate respectively.

Figure 3:
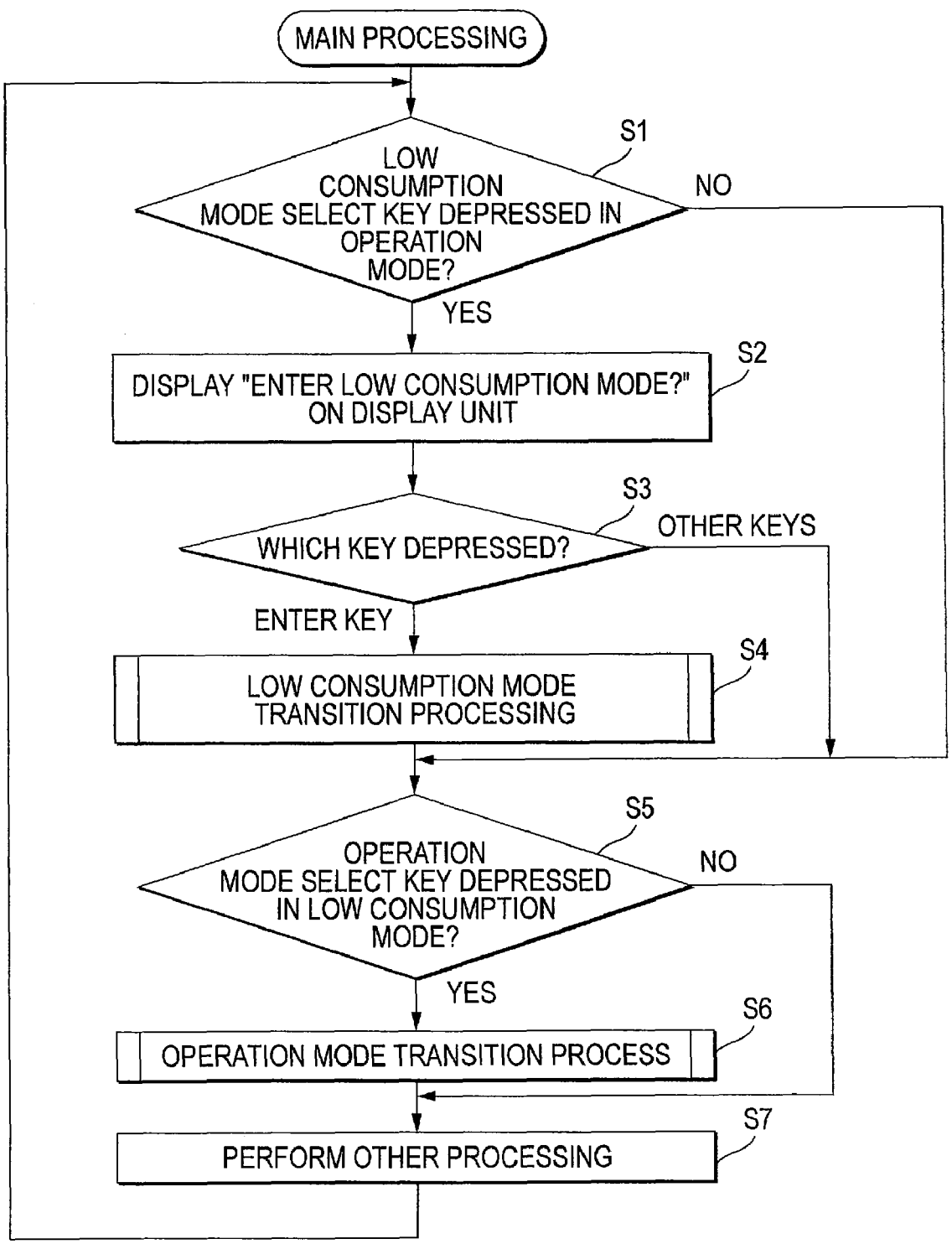
FIG. 3 is a flowchart showing main processing of the MFP.
Figure 4:
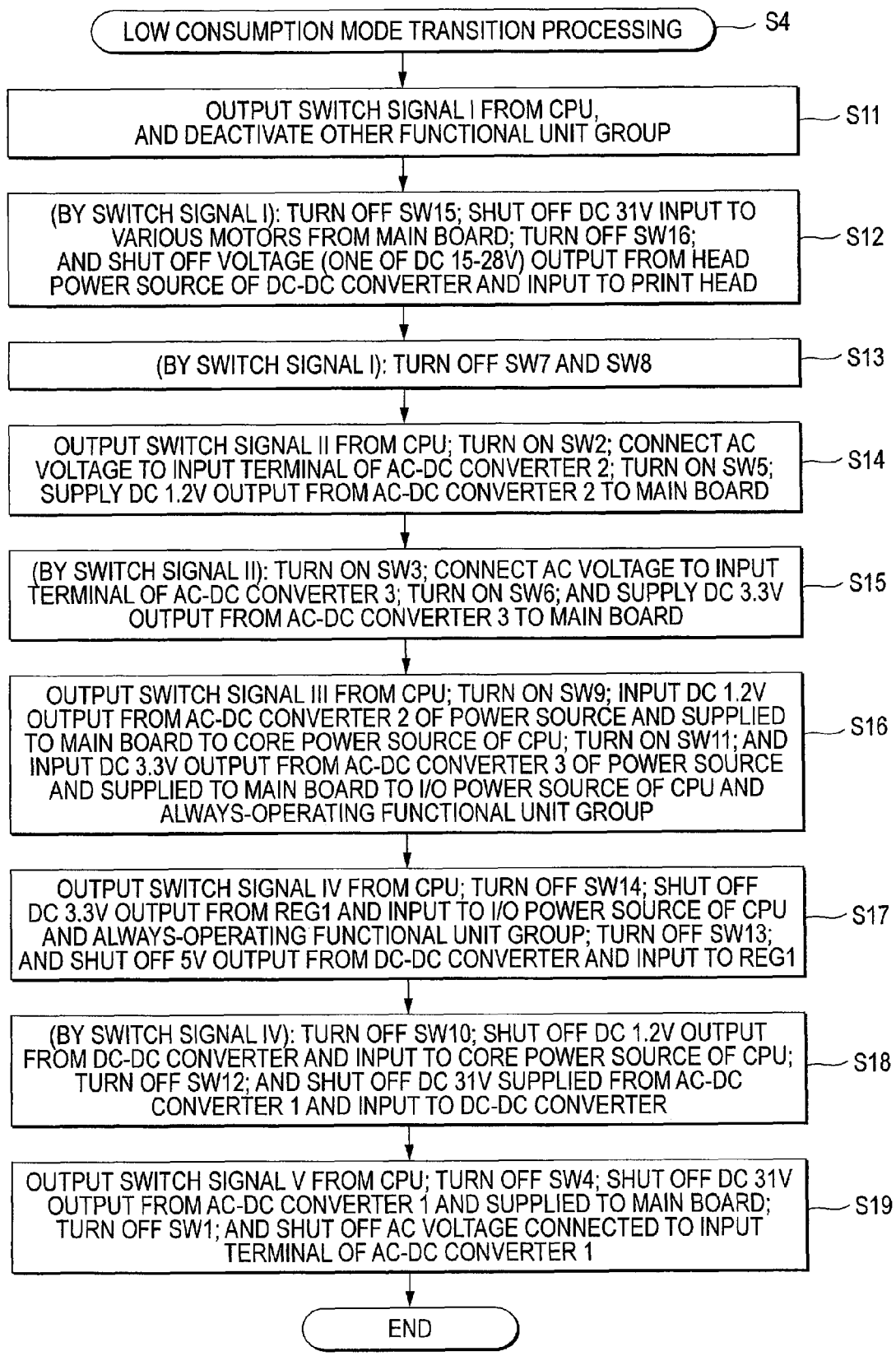
FIG. 4 is a flowchart showing low consumption mode transition processing of the MFP.
Figure 5:
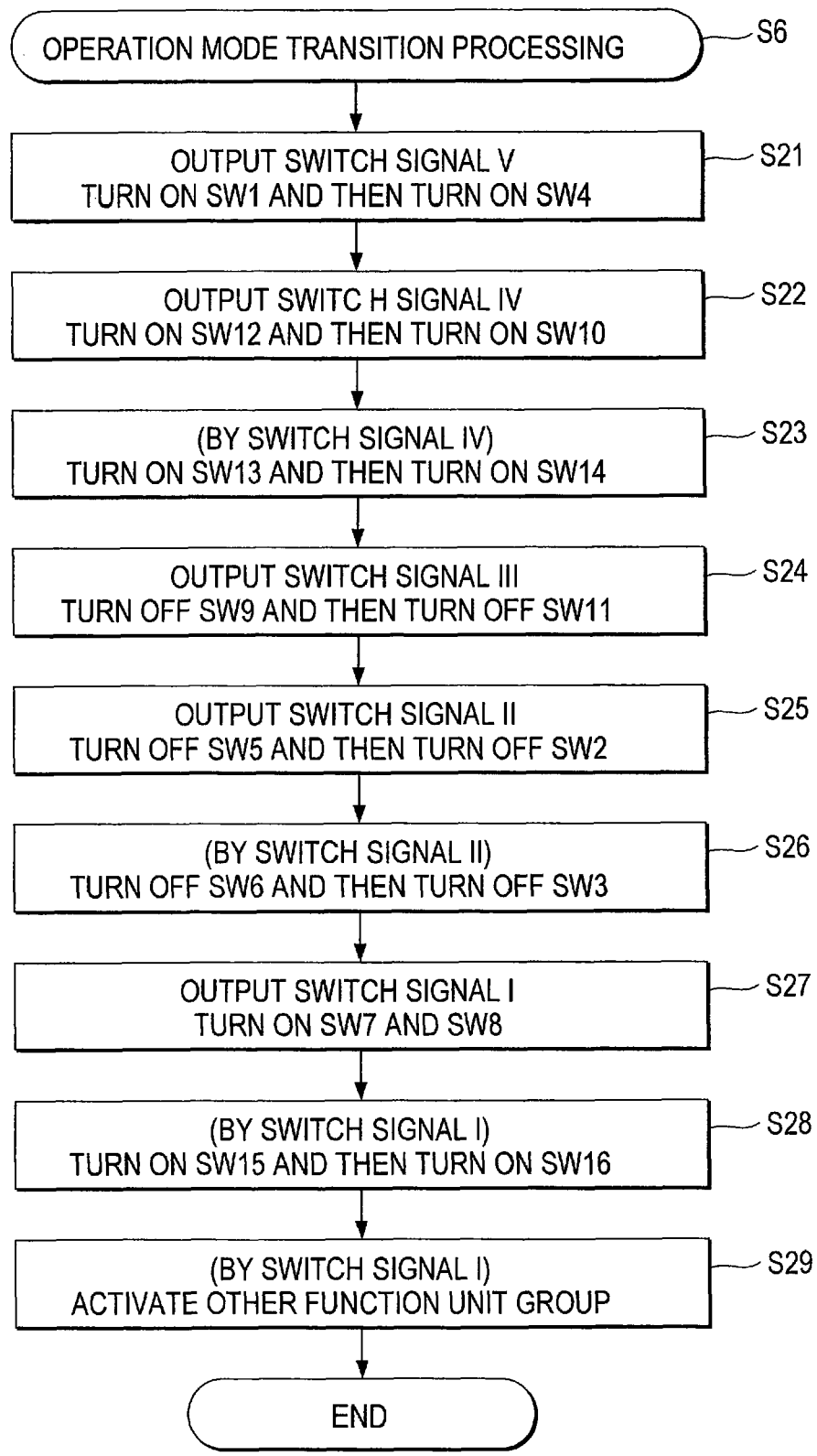
FIG. 5 is a flowchart showing operation mode transition processing of the MFP.

The ROM 24 is non-rewritable memory that stores a control program to be executed by the MFP 20, and programs represented by flowcharts shown in FIGS. 3, 4, and 5 are stored in the ROM 24. The RAM 25 is rewritable volatile memory for temporarily storing various sets of data at the time of performance of respective operations of the MFP 20. The flash memory 26 is rewritable nonvolatile memory. Data stored in the flash memory 26 are retained even after shutoff of the main power of the MFP 20 (e.g., even when all of the switches SW1 through SW3 are turned off).

The operation detection unit 28 detects various operation keys of the operation unit 27 (see FIG. 1) to be depressed by the user, an opened/closed status of the document cover unit 58 (see FIG. 1), and arrival of an incoming call from an external device (not shown) by way of a telephone line (not shown). The other functional unit group 23 is made up of a functional unit which deactivates its operation when the image forming apparatus is in a low consumption mode; and is provided with the display unit 29, the speaker 30, the printer control unit 31, the scanner control unit 32, and the communication control unit 33. When DC 3.3 volts and DC 5 volts are input to the other functional unit group 23, the respective functional units 29 to 33 are activated.

The printer control unit 31 is a control circuit unit of the printer 59 (see FIG. 1) and performs various control operations, such as image processing and print processing, when an image is recorded on a recording sheet. The scanner control unit 32 is a circuit control unit of the scanner 60 (see FIG. 1) and performs read processing for reading a document and various control operations such as image processing for correcting a read image.

The communication control unit 33 controls the telephone line (not shown) and communication of data exchanged by way of the telephone line. The communication control unit 33 is connected to the telephone line (not shown). When connected to the external device (not shown) by way of the telephone line, the MFP 20 can exchange data with the external device (not shown).

The DC-DC converter 44 is a voltage converter that receives an input of DC 31 volts supplied from the power source 100; generates a plurality of DC voltages; and outputs the DC voltages individually. Specifically, when DC 31 volts is input to the DC-DC converter 44, DC 1.2 volts are output from the CPU power source; DC 5 volts are output from the REG power source; and any one of DC 15 volts to DC 28 volts is output from the head power source, individually. The voltage (any one of DC 15 volts to 28 volts) output from the head power source is determined by the printer control unit 31 according to the status of the print head.

The other end of the switch SW12 is connected to an input terminal of the DC-DC converter 44, and one end of the switch SW12 is connected to the other end of the first connecting line 47, one end of the switch SW8, and one end of the switch SW15. An output terminal of the CPU power source of the DC-DC converter 44 is connected to the other end of the switch SW10, and one end of the switch SW10 is connected to the other end of the switch SW9 and the core power source of the CPU 21.

When the CPU 21 turns on the switch SW10, DC 1.2 volts output from the CPU power source of the DC-DC converter 44 is input to the core power source of the CPU 21. Either DC 1.2 volts output from the CPU power source of the DC-DC converter 44 or DC 1.2 volts supplied from the second AC-DC converter 42 of the power source 100 (when the switches SW 2, 5, and 9 are turned on), or both, are input to the core power source of the CPU 21.

One end of the switch SW13 is connected to the output terminal of the REG power source of the DC-DC converter 44, and the other end of the switch SW13 is connected to an input terminal of the first regulator 45, an input terminal of the second regulator 46, and the other functional unit group 23. When the CPU 21 turns, on the switch SW13, DC 5 volts output from the REG power source of the DC-DC converter 44 is input to the input terminal of the first regulator 45, the input terminal of the second regulator 46, and the other functional unit group 23.

The output terminal of the head power source of the DC-DC converter 44 is connected to one end of the switch SW16, and the other end of the switch SW16 is connected to the print head (not shown) of the printer 56 (see FIG. 1). When the CPU 21 turns on the switch SW16, a voltage (any one of DC 15 volts to DC 28 volts) output from the head power source of the DC-DC converter 44 is input to the print head (not shown) of the printer 56 (see FIG. 1). The voltage (any one of DC 15 volts to DC 28 volts) output from the head power source is determined by the printer control unit 31 according to the status of the print head.

The other end of the switch SW15 is connected to various motors, such as a recording sheet conveyance motor (not shown) of the printer 59 (see FIG. 1), a print carriage motor (not shown) of the printer 59 (see FIG. 1), and a scanner carriage motor (not shown) of the scanner 60 (see FIG. 1). When the CPU 21 turns on the switch SW15, DC 31 volts supplied from the power source 100 are input to the various motors.

The first regulator 45 is a voltage converter that receives as an input of DC 5 volts output from the REG power source of the DC-DC converter 44 and that outputs DC 3.3 volts. The first regulator 45 is for preventing influence of noise developing in the course of operation of the MFP 20 and supplying a stable constant voltage to the CPU 21 and the always-operating functional unit group 22. In order to shorting wiring for the purpose of minimizing the influence of noise, the first regulator 45 is mounted on the main board 200.

An output terminal of the first regulator 45 is connected to the other end of the switch SW14, and one end of the switch SW14 s connected to the other end of the switch SW11, the I/O power source of the CPU 21, and the always-operating functional unit group 22.

When the CPU 21 turns on the switch SW14, DC 3.3 volts output from the first regulator 45 is input to the I/O power source of the CPU 21 and the always-operating functional unit group 22. Either DC 3.3 volts output from the first regulator 45 or DC 3.3 volts output from the AC-DC converter 43 of the power source 100 (when the switches SW 3, 6, and 11 are turned on), or both, are input to the I/O power source of the CPU 21 and the always-operating functional unit group 22.

The second regulator 46 is a voltage converter that receives an input of DC 5 volts output from the REG power source of the DC-DC converter 44 and outputs DC 3.3 volts. The second regulator 46 is for preventing influence of noise developing in the course of operation of the MFP 20 and supplying a stable constant voltage to the other functional unit group 23. In order to shorting wiring for the purpose of minimizing the influence of noise, the second regulator 46 is mounted on the main board 200. An output terminal of the second regulator 46 is connected to the other functional unit group 23.

The CPU 21, the always-operating functional unit group 22, and the other functional unit group 23 are susceptible to noise and cause faulty operation upon undergoing noise. Extremely large noise develops in the operation mode for reasons of operations of various motors (not shown), operation of the print head (not shown), and the like. Therefore, stable voltages that are output from the first and second regulators 45 and 46 and are protected from the influence of noise must be supplied to the CPU 21, the always-operating functional unit group 22, and the other functional unit group 23. Therefore, as mentioned previously, the first and second regulators 45 and 46 are mounted on the main board 200 in order to shorten wiring.

However, noise essentially equal in level to the noise that affects the CPU 21, the always-operating functional unit group 22, and the other functional unit group 23 does not arise in the low consumption mode. For this reason, the voltages output from the AC-DC converters 42 and 43 mounted on the power source 100 can be input and used in unmodified form without involvement of the first and second regulators 45 and 46.

The operation mode of the MFP 20 will be described by reference to FIG. 2. FIG. 2 is a block diagram schematically showing a supply channel of the electric power input to the respective functional units 24 to 33 of the main board 200 when the MFP 20 is in the operating mode.

The switches SW1, SW4, and SW7 of the power source 100 remain activated in the operation mode, and the AC voltage 70 is input to the first AC-DC converter 41, and DC 31 volts are output from the output terminal of the first AC-DC converter 41.

In the main board 200, the switch SW8 is turned on, and the switch SW9 is turned off. DC 31 volts output from the first AC/DC converter 41 of the power source 100 are input to the main board 200 by way of the two connecting lines 47 and 48. Therefore, even when any one of the connecting lines 47 and 48 becomes broken, DC 31 volts can be input to the main board 200 by way of the other connecting line, and hence the respective functional units 24 to 33 of the main board 200 can be stably operated (a fail-safe function).

In the meantime, the switches SW2, SW3, SW5, and SW6 of the power source 100 are turned off, and the AC voltage 70 is not input to the second AC-DC converter 42 and the third AC-DC converter 43. Hence, the respective AC-DC converters 42 and 43 do not operate.

In the operating mode, electric power for operation purpose is supplied from the first AC-DC converter 41 to all of the functional units 24 to 33 of the main board 200 of the MFP 20, various motors, and the print head. Therefore, the second AC-DC converter 42 and the third AC-DC converter 43 do not need to perform voltage conversion; and the voltage (the AC voltage 70) input to the respective AC-DC converters 42 and 43 is blocked, to thus deactivate the voltage conversion function. Thereby, consumption of unwanted electric power (electric power consumed during voltage conversion) can be diminished.

In the main board 200, the switches SW9 and SW11 remain deactivated, and the switches SW8, SW10, and SW12 to SW16 remain activated. DC 31 volts input from the power source 100 to the main board 200 are input to the DC-DC converter 44 and the various motors. The various motors include motors such as the recording sheet conveyance motor (not shown) of the printer 59 (see FIG. 1), the print carriage motor (not shown) of the printer 59 (see FIG. 1), and the scanner carriage motor (not shown) of the scanner 60 (see FIG. 1).

DC 1.2 volts output from the CPU power source of the DC-DC converter 44 are input to the core power source of the CPU 21, and DC 5 volts output from the REG power source of the DC-DC converter 44 are input to the first regulator 45, the second regulator 46, and the other functional unit group 23. The voltage (any one of DC 15 volts to DC 28 volts) output from the head power source is determined by the printer control unit 31 according to the status of the print head.

Main processing to be performed by the CPU 21 of the MFP 20 will now be described by reference to the flowchart shown in FIG. 3. FIG. 3 is a flowchart showing main processing repeatedly executed from when the main power source of the MFP 20 is turned on until when the main power source is shut off. Main processing is for switching the operating status of the MFP 20. When the user depresses the low consumption mode select key 27a of the operation unit 27, the MFP 20 shifts to the low consumption mode. When the user depresses the operation mode select key 27b, the MFP 20 shifts to the operating mode.

In main processing, a determination is first made, in the operating mode, as to whether or not the user has depressed the low consumption mode select key 27a of the operation unit 27 (S1). When the user depresses the low consumption mode select key 27a (Yes in S1), a message "enter low consumption mode?" appears on the display unit 29 (S2). In the meantime, when the user does not depress the low consumption mode select key 27a (No in S1), processing pertaining to S2 to S4 is skipped, and processing proceeds to S5.

Next, a determination is made as to the nature of the key depressed by the user (S3). When the user depressed the enter key 27c, low consumption mode transition processing is performed (S4). In contrast, when a key other than the enter key 27c is depressed, processing pertaining to S4 is skipped, and processing proceeds to S5.

Low consumption mode transition processing (S4) will now be described by reference to the flowchart shown in FIG. 4. FIG. 4 is a flowchart showing low consumption mode transition processing (S4). The low consumption mode transition processing (S4) is for shifting the MFP 20 from the operating mode to the low consumption mode so as to change the power supply state from a state where the electric power is supplied to all of the functional units (see FIG. 2) of the main board 200 of the MFP 20 in the operating mode to a state where the electric power is supplied only to the CPU 21 and the always-operating functional unit group 22.

During low consumption mode transition processing (S4), the switch signals I to V (see FIGS. 6 to 10) are sequentially input to the respective switches SW1 through SW16 from the CPU 21, thereby supplying only the CPU 21 (see FIG. 2) and the always-operating functional unit group 22 (see FIG. 2) with only electric power required to activate them.

The switch signals I to V (see FIGS. 6 through 10) output from the CPU 21 are input individually to the switches SW1 through SW7 of the power source 100 and the switches SW8 to SW16 of the main board 200 by way of individual signal lines (not shown). The switch signal I (see FIG. 6) output from the CPU 21 is input to the other functional unit group 23 by way of a bus line (not shown).

In low consumption mode transition processing (S4), the CPU 21 outputs the switch signal I, thereby deactivating the other functional unit group 23 of the main board 200 (S11). The switch SW15 of the main board 200 is turned off (by means of the switch signal I output from the CPU 21), thereby shutting off DC 31 volts input to the various motors from the main board 200 and turning off the switch SW16. Thus, the voltage (any one of DC 15 volts to 28 volts) that is output from the head power source of the DC-DC converter 44 and that is input to the print head of the printer 59 (see FIG. 1) is shut off (S12).

The voltage (any one of DC 15 volts to 28 volts) that is output from the head power source is determined by the printer control section 31 according to the status of the print head of the printer 59 (see FIG. 1). The various motors include motors such as the recording sheet conveyance motor (not shown) of the printer 59 (see FIG. 1), the print carriage motor (not shown) of the printer 59 (see FIG. 1), and the scanner carriage motor (not shown) of the scanner 60 (see FIG. 1).

The switch SW7 of the power source 100 and the switch SW8 of the main board 200 are turned off (by means of the switch signal I output from the CPU 21) (S13).

Figure 6:
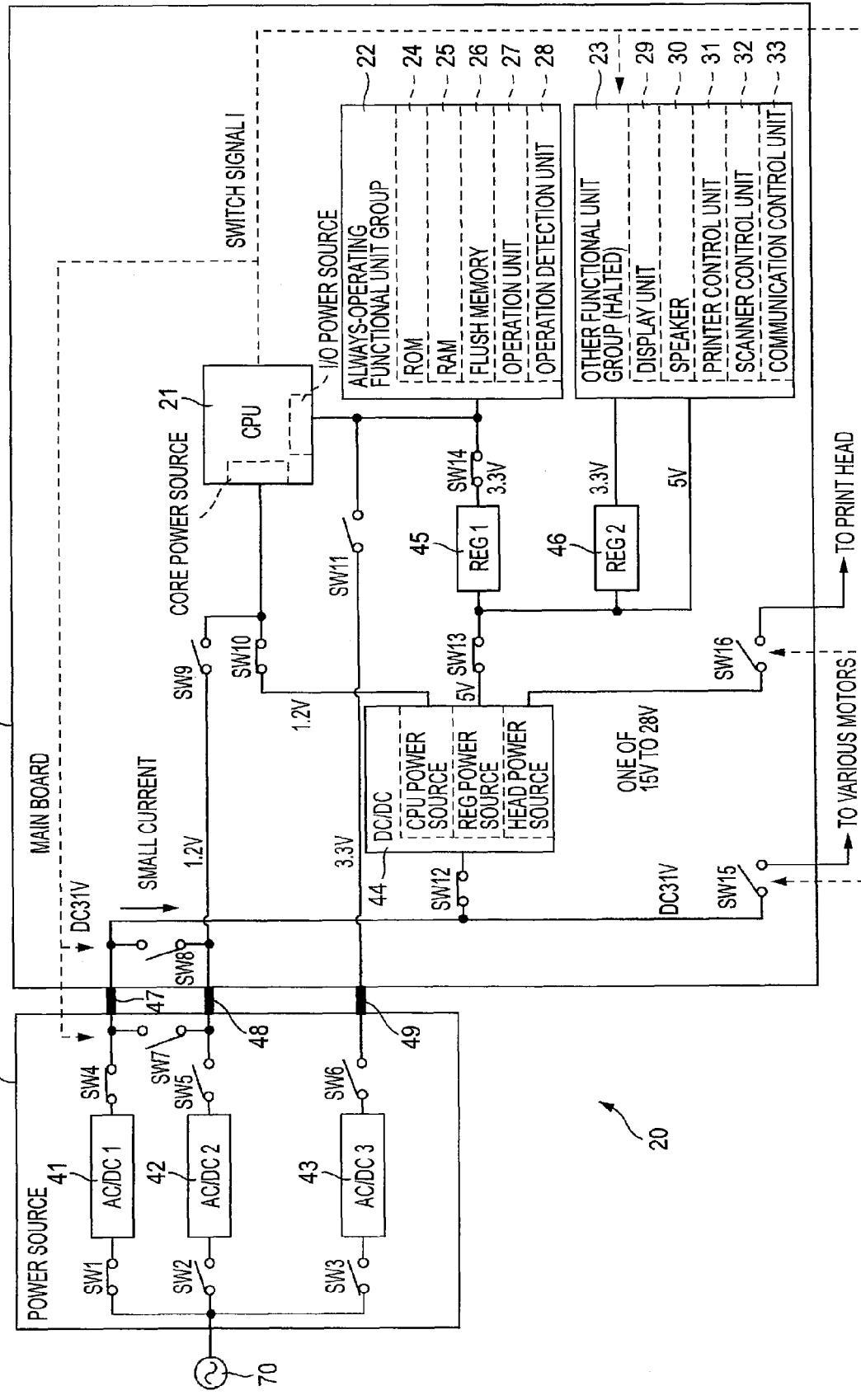
FIG. 6 is a block diagram schematically showing the power supply channel achieved in a switching state I.

Operation of the other functional unit group 23 that is controlled by the switch signal I output from the CPU 21 and operations of the switches SW7, SW8, SW15, and SW16 will now be described by reference to FIG. 6. FIG. 6 shows a state where the switch signal I output from the CPU 21 is input to the other functional unit group 23 and the switches SW7, SW8, SW15, and SW16 in the operating mode (see FIG. 2). The state where the switch signal I is input is referred to as a switching state I.

When the switch signal I is output from the CPU 21, the function of the main board 200 and that of the other functional unit group 23 are deactivated. The switches SW15 and SW16 of the main board 200 turned off, thereby deactivating the various motors and the print head that consume much electric power. Accordingly, the electric power supplied to the main board 200 is reduced.

Moreover, the switch SW7 of the power source 100 and the switch SW8 of the main board 200 are turned off, and DC 31 volts output from the first AC-DC converter 41 of the power source 100 are supplied to the main board 200 by means of only the first connecting line 47.

A return to descriptions of the flowchart shown in FIG. 4 is provided. Next, the switch signal II is output from the CPU 21, to thus turn on the switch SW2 of the power source 100. The AC voltage 70 is connected to the input terminal of the second AC-DC converter (AC-DC 2) 42, and the switch SW5 is turned on, whereby DC 1.2 volts output from the second AC-DC converter 42 is supplied to the main board (S14).

The switch SW3 is turned on (by means of the switch signal II output from the CPU 21), and the AC voltage 70 is connected to the input terminal of the third AC-DC converter 43. The switch SW6 is then turned on, thereby supplying DC 3.3 volts output from the third AC-DC converter 43 to the main power source 200 (S15).

Figure 7:
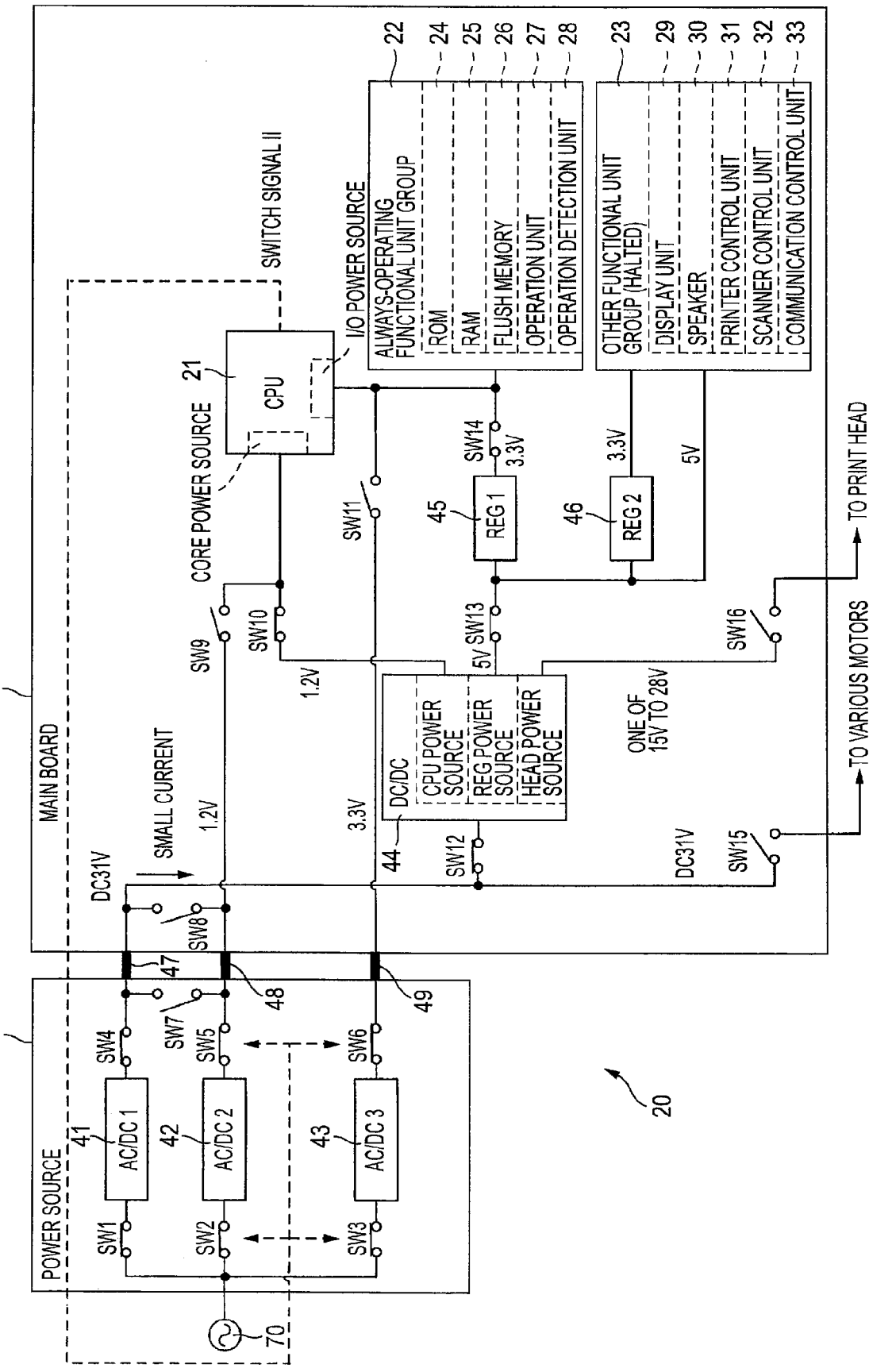
FIG. 7 is a block diagram schematically showing the power supply channel achieved in a switching state II.

Operations of the switches SW2, SW3, SW5, and SW6 controlled by the switch signal II output from the CPU 21 will be described by reference to FIG. 7. FIG. 7 shows a state where the switch signal II output from the CPU 21 is input to the switches SW2, SW3, SW5, and SW6 in the switching state I (see FIG. 6). The state where the switch signal II is input is referred to as a switching state II.

When the CPU 21 outputs the switch signal II, the switch SW2 of the power source 100 is turned on. The AC voltage 70 is input to the input terminal of the second AC-DC converter 42. When DC 1.2 volts are output from the second AC-DC converter 42 and when the switch SW5 is turned on, DC 1.2 volts are input to the main board 200.

Subsequently, the switch SW3 is turned on, and the AC voltage 70 is input to the input terminal of the third AC-DC converter 43. DC 3.3 volts are output from the third AC-DC converter 43. When the switch SW6 is turned on, DC 3.3 volts are input to the main board 200.

A return to descriptions of the flowchart shown in FIG. 4 is provided. Next, the CPU 21 outputs the switch signal III, and the switch SW9 of the main board 200 is turned on. DC 1.2 volts that are output from the second AC-DC converter 42 of the power source 100 and that are supplied to the main board 200 are input to the core power source of the CPU 21, thereby turning on the switch SW11 of the main board 200. DC 3.3 volts that are output from the third AC-DC converter 43 of the power source 100 and supplied to the main board 200 are input to the I/O power source of the CPU 21 and the always-operating functional unit group 22 (S16).

Figure 8:
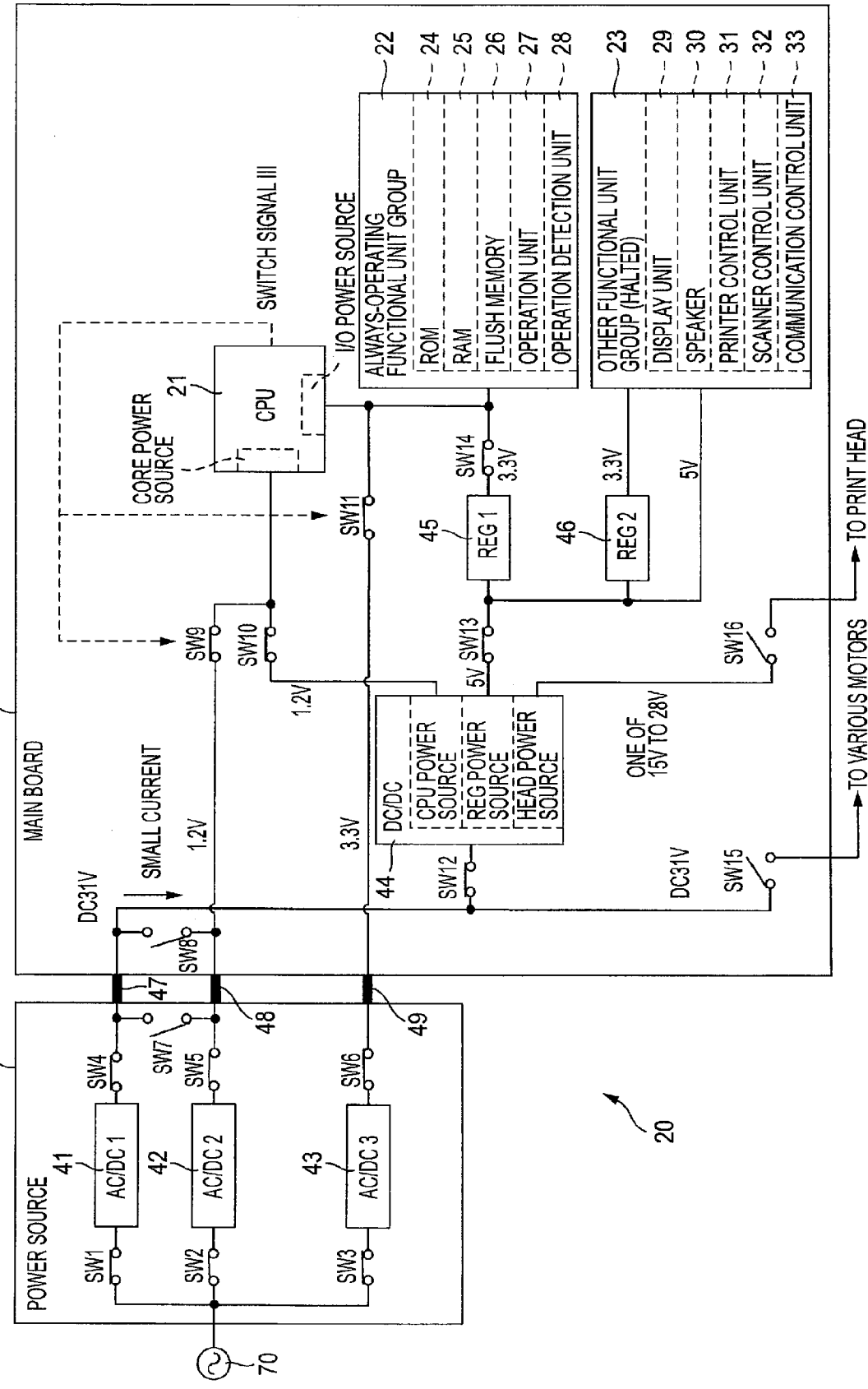
FIG. 8 is a block diagram schematically showing the power supply channel achieved in a switching state III.

Operations of the switches SW9 and SW11 controlled by the switch signal III output from the CPU 21 will be described by reference to FIG. 8. FIG. 8 shows a state where the switch signal II output from the CPU 21 is input to the switches SW9 and SW11 in the switching state II (see FIG. 7). A state where the switch signal III is input is referred to as a switching state III.

When the CPU 21 outputs the switch signal III, the switch SW9 of the main board 200 is turned on, and DC 1.2 volts that are output from the second AC-DC converter 42 of the power source 100 and that are supplied to the main board 200 are input to the core power source of the CPU 21.

Subsequently, the switch SW11 of the main board 200 is turned on, and DC 3.3 volts that are output from the third AC-DC converter 43 of the power source 100 and that are supplied to the main board 200 are input to the I/O power source of the CPU 21 and the always-operating functional unit group 22.

In the switching state III, DC 1.2 volts output from the second AC-DC converter 42 of the power source 100 and DC 1.2 volts output from the CPU power source of the DC-DC converter 44 of the main board 200 are input to the core power source of the CPU 21.

Likewise, DC 3.3 volts output from the third AC-DC converter 43 of the power source 100 and DC 3.3 volts output from the first regulator 45 of the main board 200 are input to the I/O power source of the CPU 21.

A return to descriptions of the flowchart shown in FIG. 4 is provided. Next, the CPU 21 outputs a switch signal IV, thereby turning off the switch SW14 of the main board 200 and blocking DC 3.3 volts that are output from the first regulator 45 and that are input to the I/O power source of the CPU 21 and the always-operating functional unit group 22. The switch SW13 is turned off, so that DC 5 volts that are output from the REG power source of the DC-DC converter 44 and input to the first regulator 45 are shut off (S17).

The switch SW10 is turned off (by means of the switch signal IV output from the CPU 21), and DC 1.2 volts that are output from the CPU power source of the DC-DC converter 44 and input to the core power source of the CPU 21 are shut off. The switch SW12 is turned off, and DC 31 volts that are supplied from the first AC-DC converter 41 of the power source 100 and that are input to the main board 200 are shut off (S18).

Figure 9:
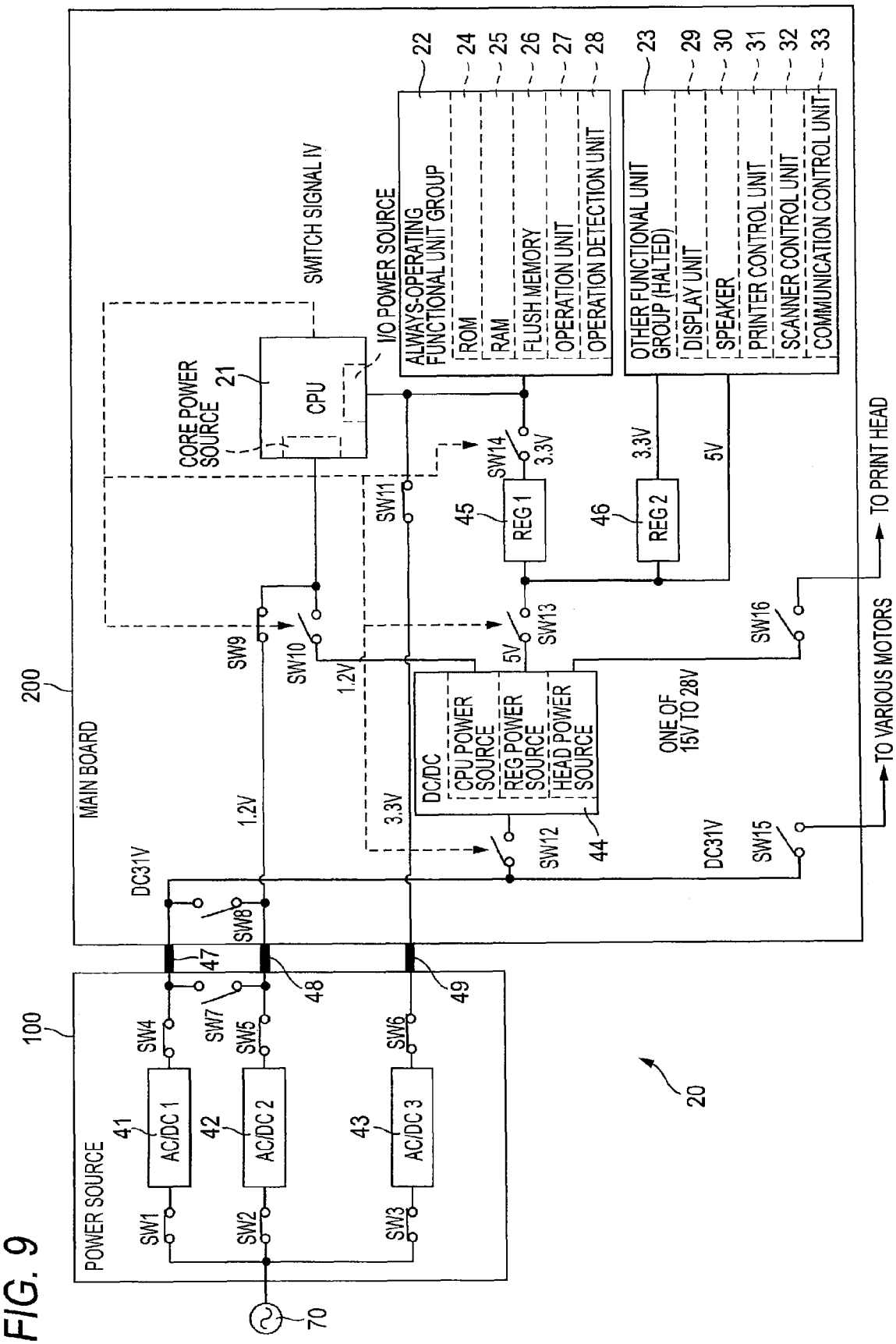
FIG. 9 is a block diagram schematically showing the power supply channel achieved in a switching state IV.

By reference FIG. 9, operations of the switches SW10 and SW12 to SW14 controlled by the switch signal IV output from the CPU 21 are described. FIG. 9 shows a state in which the switch signal IV output from the CPU 21 is input to the switches SW10 and SW12 to SW14 in the switching state III (see FIG. 8). A state where the switch signal IV is input is referred to as a switching state IV.

When the switch signal IV is input to the CPU 21, the switch SW14 of the main board 200 is turned off, so that DC 3.3 volts that are output from the first regulator 45 and that are input to the I/O power source of the CPU 21 and the always-operating functional unit group 22 are shut off.

DC 3.3 volts output from the third AC-DC converter 43 of the power source 100 are input to the I/O power source of the CPU 21 and the always-operating functional unit group 22 in the switching state III shown in FIG. 8. Therefore, even when the switch SW14 is turned off, DC 3.3 volts required for operation are continually input to the I/O power source of the CPU 21 and the always-operating functional unit group 22, thereby enabling the CPU and the functional unit group 22 to operate stably.

Subsequently, the switch SW13 is turned off, whereupon DC 5 volts that are output from the REG power source of the DC-DC converter 44 and that are input to the first regulator 45 are shut off. Since the switch SW13 is turned off after deactivation of the switch SW14, a voltage output from the first regulator 45 can be prevented from becoming higher than a voltage input to the first regulator 45. Thus, occurrence of a reverse current flowing from the output terminal of the first regulator 45 to the input terminal of the same can be prevented.

The switch SW10 is turned off, and DC 1.2 volts that are output from the CPU power source of the DC-DC converter 44 and that are input to the core power source of the CPU 21 are shut off. In the switching state III shown in FIG. 8, DC 1.2 volts output from the second AC-DC converter 42 of the power source 100 have already been input to the core power source of the CPU 21. Therefore, even when the switch SW10 is turned off, DC 1.2 volts required for operation are continually input to the core power source of the CPU 21, and hence the CPU can be operated stably.

The switch SW12 is turned off, whereupon DC 31 volts that are output from the first AC-DC converter 41 of the power source 100 and input to the DC-DC converter 44 of the main board 200 are shut off. Since the switch SW12 is turned off after deactivation of the switches SW10, SW13, and SW16, a voltage output from the DC-DC converter 44 can be prevented from becoming higher than a voltage input to the DC-DC converter 44, and occurrence of a reverse current flowing from the output terminal of the DC-DC converter 44 to the input terminal of the same can be prevented.

A return to descriptions of the flowchart shown in FIG. 4 is provided. Next, the switch SW4 of the power source 100 is turned off by means of outputting the switch signal V from the CPU 21, thereby shutting off DC 31 volts that are output from the AC-DC converter 41 and that are supplied to the main board 200. The switch SW1 is then turned off, thereby shutting off the AC voltage 70 connected to the first AC/DC converter 41 (S19).

Figure 11:
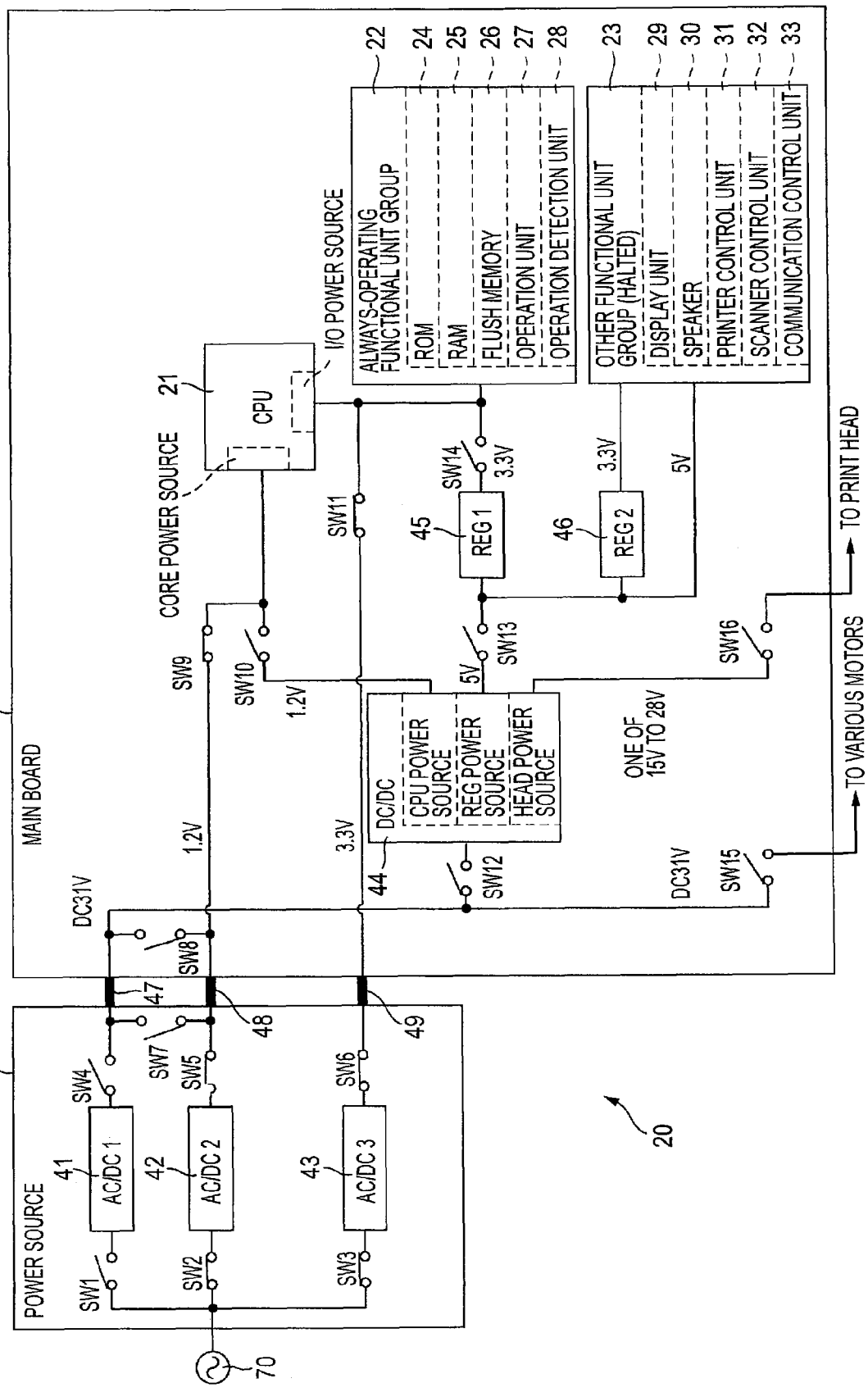
FIG. 11 is a block diagram schematically showing a power supply channel achieved in a low consumption mode.

When previously-described low consumption mode transition processing (S4) is completed, the MFP 20 enters the low consumption mode shown in FIG. 11. By means of low consumption mode transition processing (S4), the user can shift the MFP 20 from the operating mode to the low consumption mode. After completion of low consumption mode transition processing (S4), processing returns to S5 shown in FIG. 3.

Figure 10:
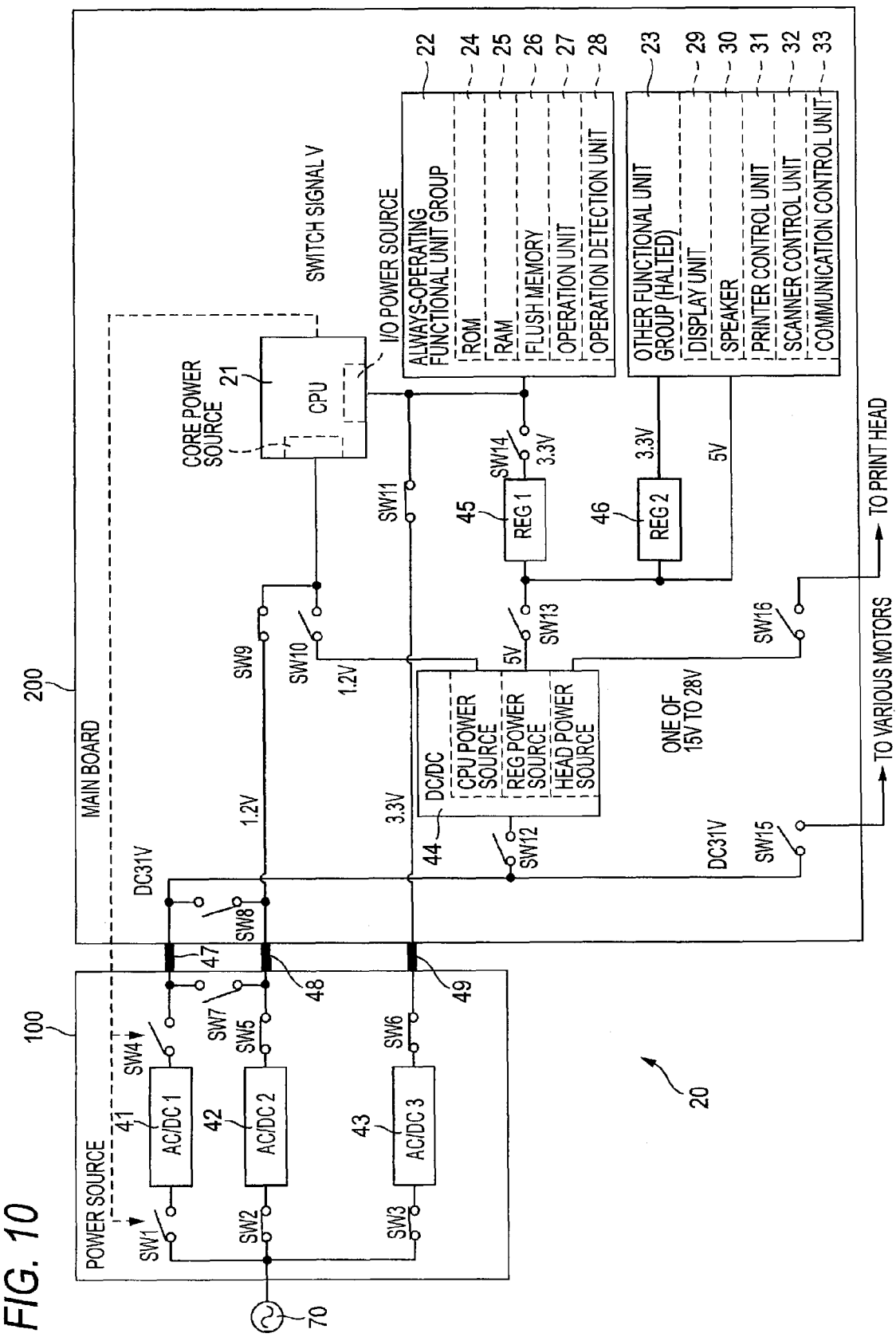
FIG. 10 is a block diagram schematically showing the power supply channel achieved in a switching state V.

By reference to FIG. 10, operations of the switches SW1 and SW4 controlled by the switch signal V output from the CPU 21 will now be described. FIG. 10 shows a state where the switch signal V output from the CPU 21 is input to the switches SW1 and SW4 in a switching state IV (see FIG. 9). A state where the switch signal V is input is referred to as a switching state V.

When the CPU 21 outputs the switch signal V, the switch SW4 of the power source 100 is turned off, whereby DC 31 volts that are output from the first AC-DC converter 41 and that are supplied to the main board 200 are shut off. The switch SW1 is turned off, and the AC voltage 70 connected to the input terminal of the first AC-DC converter 41 is shut off, whereby the MFP 20 enters a low consumption mode.

When the input of the AC voltage 70 is shut off, the voltage conversion of the first AC-DC converter 41 is deactivated, so that consumption of unwanted electric power (electric power consumed during voltage conversion) can be diminished.

The switch SW1 is turned off after deactivation of the switch SW4. Hence, the voltage output from the first AC-DC converter 41 can be prevented from becoming higher than a voltage input to the same. Occurrence of a reverse current flowing from the output terminal of the first AC-DC converter 41 to the input terminal of the same can be prevented. After S19, the switches 7 and 8 may be turned on to provide the fail-safe function during the low consumption mode, as well as the operation mode.

A return to the flowchart shown in FIG. 3 is provided. When the low consumption mode select key 27a is not depressed by the user after completion of low consumption mode transition processing (S4) or in the course of the operation mode during processing pertaining to S1 (No in S1), a determination is made as to whether or not the user depressed the operation mode select key 27b during the low consumption mode (S5). When the user depressed the operation mode select key 27b in the low consumption mode during processing pertaining to S5 (Yes in S5), operation mode transition processing is performed (S6). When the user did not depress the operation mode select key 27b in the low consumption mode (No in S5), another processing is performed (S7).

Operation mode transition processing (S6) will now be described by reference to FIG. 5. FIG. 5 is a flowchart showing operation mode transition processing (S6). Operation mode transition processing (S6) is for shifting the MFP 20 from the low consumption mode to the operating mode and for switching the power supply state from a state where the electric power is supplied to all of the functional units of the main board 200 of the MFP 20 in the low consumption mode to a state where the electric power is supplied only to the CPU 21 (see FIG. 2) and the always-operating functional unit group 22 (see FIG. 2).

During operation mode transition processing (S6), the switch signal is output sequentially to the respective switches SW1 through SW16 from the CPU 21, whereby all of the functional units of the main board 200 are supplied with electric power required to operate the functional units.

The switch signals I to V (see FIGS. 6 through 10) output from the CPU 21 are input individually to the switches SW1 through SW7 of the power source 100 and the switches SW8 to SW16 of the main board 200 by way of individual signal lines (not shown). The switch signal I (see FIG. 6) output from the CPU 21 is input individually to the other functional unit group 23 by way of the bus line (not shown).

During operation mode transition processing (S6), the CPU 21 first outputs the switch signal V, thereby turning on the switch SW1 of the power source 100. The AC voltage 70 is connected to an input terminal of the first AC-DC converter 41, and the switch SW4 is turned on, thereby supplying the main board 200 with DC 31 volts output from the first AC-DC converter 41 (S21).

By reference to FIG. 10, operations of the switches SW1 and SW4 controlled by the switch signal V output from the CPU 21 will now be described. FIG. 10 shows a state where the switch signal V output from the CPU 21 is input to the switches SW1 and SW4 in the low consumption mode (see FIG. 11); namely, the switching state V.

When the switch signal V is output from the CPU 21, the switch SW1 of the power source 100 is turned on, whereupon the AC voltage 70 is connected to the input terminal of the first AC-DC converter 41. When the switch SW4 is turned on, DC 31 volts output from the first AC-DC converter 41 are supplied to the main board 200.

Since the switch SW4 is turned on after activation of the switch SW1, a voltage output from the first AC-DC converter 41 can be prevented from becoming higher than a voltage input to the first AC-DC converter 41. Occurrence of a reverse current flowing from the output terminal of the first AC-DC converter 41 to the input terminal of the same can be prevented.

A return to descriptions of the flowchart shown in FIG. 5 is provided. Next, the switch signal IV is output from the CPU 21; the switch SW12 of the main board 200 is turned on; DC 31 volts that are output from the AC-DC converter 41 of the power source 100 and that are supplied to the main board 200 are input to the DC-DC converter 44; the switch SW10 of the main board 200 is turned on; and DC 1.2 volts output from the CPU power source of the DC-DC converter 44 are input to the input terminal of the core power source of the CPU 21 (S22).

The switch SW13 of the main board 200 is turned on (by the switch signal IV output from the CPU 21); DC 5 volts output from the REG power source of the DC-DC converter 44 are input to the first regulator 45; the switch SW14 is turned on; and DC 3.3 volts output from the first regulator 45 are input to the I/O power source of the CPU 21 and the always-operating functional unit group 22 (S23).

The switches SW10 and SW12 to SW14 controlled by the switch signal IV output from the CPU 21 will now be described by reference to FIG. 9. FIG. 9 shows a state where the switch signal IV output from the CPU 21 is input to the switches SW10 and SW12 to SW14; namely, the switching state IV, in the switching state V (see FIG. 10).

When the CPU 21 outputs the switch signal IV, the switch SW12 of the main board 200 is turned on, whereby DC 31 volts that are output from the first AC-DC converter 41 of the power source 100 and that are supplied to the main board 200 are input to the DC-DC converter 44. The switch SW10 of the main board 200 is turned on, and DC 1.2 volts output from the CPU power source of the DC-DC converter 44 are input to the core power source of the CPU 21.

In the switching state IV, DC 1.2 volts output from the CPU power source of the DC-DC converter 44 of the main board 200 and DC 1.2 volts output from the second AC-DC converter 42 of the power source 100 are input to the core power source of the CPU 21.

The switches SW10 and SW13 are turned on after activation of the switch SW12, and hence the voltage output from the DC-DC converter 44 can be prevented from becoming higher than the voltage input to the DC-DC converter 44. The reverse current flowing from the output terminal of the DC-DC converter 44 to the input terminal of the same can be prevented.

The switch SW13 of the main board 200 is turned on, and DC 5 volts output from the DC-DC converter 44 are input to the first regulator 45. The switch SW14 is turned on, and DC 3.3 volts output from the first regulator 45 are input to the I/O power source of the CPU 21 and the always-operating functional unit group 22.

In the switching state IV, DC 3.3 volts output from the first regulator 45 of the main board 200 and DC 3.3 volts output from the third AC-DC converter 43 of the power source 100 are input to the I/O power source of the CPU 21 and the always-operating functional unit group 22.

The switch SW14 is turned on after activation of the switch SW13. Hence, an increase in the voltage output from the first regulator 45 can be prevented from a voltage input to the first regulator 45, and occurrence of a reverse current flowing from the output terminal of the first regulator 45 to the input terminal of the same can be prevented.

A return to the flowchart shown in FIG. 5 is now provided. The switch signal III is output from the CPU 21; the switch SW9 of the main board 200 is turned off; DC 1.2 volts that are output from the second AC/DC converter 42 of the power source 100 and that are supplied to the main board 200 and that are input to the core power source of the CPU 21 are shut off; the switch SW11 of the main board 200 is turned off; and DC 3.3 volts that are output from the third AC-DC converter 43 of the power source 100 and that are supplied to the main board 200 and input to the I/O power source of the CPU 21 and the always-operating functional unit group 22 are shut off (S24).

Operations of the switches SW9 and SW11 controlled by the switch signal III output from the CPU 21 will now be described by reference to FIG. 8. FIG. 8 shows a state where the switch signal III output from the CPU 21 is input to the switches SW9 and SW11 in the switching state IV (see FIG. 9); namely, the switching state III.

When the CPU 21 outputs the switch signal III, the switch SW9 of the main board 200 is turned off, and DC 1.2 volts that are output from the second AC-DC converter 42 of the power source 100 and that are supplied to the main board 200 and input to the core power source of the CPU 21 are shut off.

The switch SW11 of the main board 200 is turned off, and DC 3.3 volts that are output from the third AC-DC converter 43 of the power source 100 and that are supplied to the main board 200 and input to the I/O power source of the CPU 21 and the always-operating functional unit group 22 are shut off.

In the switching state III, DC 1.2 volts output from the PC power source of the DC-DC converter 44 are input to the core power source of the CPU 21. Therefore, even when the switch SW9 is turned off, DC 1.2 volts required for operation are continually input to the input terminal of the core power source of the CPU 21, and hence the CPU can be operated stably.

Likewise, in the switching state III, DC 3.3 volts output from the first regulator 45 are input to the input terminal of the I/O power source of the CPU 21 and the always-operating functional unit group 22. Therefore, even when the switch SW11 is turned off, DC 3.3 volts required for operation are input to the input terminal of the I/O power source of the CPU 21 and the always-operating functional unit group 22 at all times. Hence, the CPU 21 and the always-control functional unit group 22 can be operated stably.

A return to the flowchart shown in FIG. 5 is provided. The switch signal II is output from the CPU 21; the switch SW5 of the power source 100 is turned off; DC 1.2 volts that are output from the second AC-DC converter 42 and that are supplied to the main board 200 are shut off; the switch SW2 of the power source 100 is turned off; and the AC voltage 70 connected to the input terminal of the second AC-DC converter 42 is shut off (S25).

The switch SW6 of the power source 100 is turned off (by the switch signal II output from the CPU 21); DC 3.3 volts that are output from the third AC-DC converter 43 and that are supplied to the main board 200 are shut off; the switch SW3 of the power source 100 is turned off; and the AC voltage 70 connected to the input terminal of the third AC-DC converter 43 is shut off (S26).

Operations of the switches SW2, SW3, SW5, and SW6 controlled by the switch signal II output from the CPU 21 will be described by reference to FIG. 7. FIG. 7 shows a state where the switch signal II from the CPU 21 is input to the switches SW2, SW3, SW5, and SW6 in the switching state III (see FIG. 8); namely, the switching state II.

When the switch signal II is output from the CPU 21, the switch SW5 of the power source 100 is turned off, and DC 1.2 volts that are output from the second AC-DC converter 42 and that are supplied to the main board 200 are shut off. The switch SW2 of the power source 100 is turned off, and the AC voltage 70 connected to the input terminal of the second AC-DC converter 42 is shut off.

The switch SW2 is turned off after deactivation of the switch SW5. Hence, a voltage output from the second AC-DC converter 42 can be prevented from becoming higher than a voltage input to the AC-DC converter 42, and occurrence of a reverse current flowing from the output terminal of the second AC-DC converter 42 to the input terminal of the same can be prevented.

The switch SW6 of the power source 100 is turned off, and DC 3.3 volts that are output from the third AC-DC converter 43 and that are supplied to the main board 200 are shut off. The switch SW3 is shut off, and the AC voltage 70 connected to the input terminal of the third AC-DC converter 43 of the power source 100 is shut off.

The switch SW3 is turned off after deactivation of the switch SW6. Hence, a voltage output from the third AC-DC converter 43 can be prevented from becoming higher than a voltage input to the third AC-DC converter 43. Occurrence of a reverse current flowing from the output terminal of the third AC-DC converter 43 to the input terminal of the same can be prevented.

A return to descriptions of the flowchart shown in FIG. 5 will be described. Next, the switch signal I is output from the CPU 21; the switch SW7 of the power source 100 and the switch SW8 of the main board 200 are turned on, and DC 31 volts output from the first AC-DC converter 41 of the power source 100 are supplied to the main board 200 by utilization of two channels (the first connecting line 47 and the second connecting line 48) (S27).

The switch SW15 of the main board 200 is turned on (by the switch signal I output from the CPU 21), and DC 31 volts that are output from the first AC-DC converter 41 of the power source 100 and that are supplied to the main board 200 are input to the various motors, and the switch SW16 of the main board 200 is turned on. A voltage (any one of DC 15 volts to DC 28 volts) output from the head power source of the DC-DC converter 44 is input to the print head (S28).

The voltage (any one of DC 15 volts to DC 28 volts) output from the head power source of the DC-DC converter 44 is determined by means of the printer control unit 31 according to the state of the print head. The other functional unit group 23 of the main board 200 is activated (by means of the switch signal I output from the CPU 21) (S29).

The user can shift the MFP 20 from the low consumption mode to the operating mode by means of operation mode transition processing (S6). After completion of operation mode transition processing (S6), processing returns to S7 shown in FIG. 3.

Operations of the switches SW7, SW8, SW15 and SW16 controlled by the switch signal I output from the CPU 21 will be described by reference to FIG. 6. FIG. 6 shows a state in which the switch signal I from the CPU 21 is input to the switches SW7, SW8, SW15, and SW16 in the switching state II (see FIG. 7); namely, the switching state I.

When the switch signal I is output from the CPU 21, the switch SW7 of the power source 100 and the switch SW8 of the main board 200 are turned on, and DC 31 volts output from the first AC-DC converter 41 of the power source 100 are supplied to the main board 200 by way of two channels (the first and second connecting lines 47 and 48).

DC 31 volts output from the first AC-DC converter 41 of the power source 100 are input to the main board 200 by way of the two connecting lines 47 and 48. Hence, even when any one of the connecting lines becomes broken, DC 31 volts can be input to the main board 200 by way of the other connecting line, and the respective functional units of the main board 200 can be operated stably. The switches SW7 and SW8 may be simultaneously turned on or may be turned on different timings. For example, the switch SW7 may be turned on after the switch SW8 is turned on.

The switch SW15 of the main board 200 is turned on, and DC 31 volts that are output from the first AC-DC converter 41 of the power source 100 and that are supplied to the main board 200 are input to the various motors (not shown). The switch SW16 of the main board 200 is turned on, and the voltage (any one of DC 15 volts to 28 volts) output from the head power source of the DC-DC converter 44 of the main board 200 are input to the print head (not shown).

When the CPU 21 outputs the switch signal I, the function of the other functional unit group 23 of the main board 200 operates, and the MFP 20 enters an operating mode (see FIG. 2).

Turning back to the flowchart shown in FIG. 3, processing to be performed after operation mode transition processing (S6) will be described. After completion of operation mode transition processing (S6), other processing is performed (S7); processing returns to S1; and previously-described processing pertaining to S1 through S7 is iterated.

Other processing includes various processing operations, such as read processing for reading a document when the user depresses the document read key 27*d* of the operation unit 27 and image processing for correcting a read image.

The present invention has been described by reference to the embodiment, but the present invention is not limited to the previously-described embodiment at all. It can be readily estimated that the present invention is susceptible to various modifications within the scope of the gist of the present invention.

In the present embodiment, a determination as to whether or not the respective AC-DC converters 41 to 43 are to be activated is controlled by means of providing the power source 100 with the switches SW1 to SW3 and determining whether or not the AC voltage 70 is input. However, the present embodiment may also be configured such that a determination as to whether or not to activate the AC-DC converters 41 to 43 is controlled by inputting the switch signal from the CPU to the respective AC-DC converters 41 to 43.

In the present embodiment, the power source 100 and the main board 200 are configured separately from each other, and the main board 200 may be equipped with the power source 100.

In the present embodiment, a regulator is prepared for the always-operating functional unit group 22 and the other functional unit group 23, respectively. However, a regulator and a switch SW may also be prepared for the respective functional units individually.

In the present embodiment, the number of types of voltages supplied from the power source 100 to the main board 200 are three types (DC 31 volts, DC 1.2 volts, and DC 3.3 volts). The number of types of supplied voltages may also be increased or decreased according to the functional units provided in the main board.

What is claimed is:

1. An image forming apparatus comprising:
   a board comprising a plurality of functional units;
   a first power source circuit configured to output a first voltage;
   a second power source circuit configured to output a second voltage which is lower than the first voltage;
   a power switching unit configured to selectively activate the first power source circuit and the second power source circuit, individually;
   a third power source circuit mounted on the board and configured to convert the first voltage input from the first power source circuit into operation voltages to operate respective functional units;
   a mode switching unit configured to select one of power modes, the power modes including a first mode in which a first unit group comprising at least one of the plurality of functional units is activated and a second mode in which a second unit group comprising at least one of the plurality of functional units is activated; and
   a control unit,
   wherein, in the first mode, the control unit is operable to:
      control the power switching unit to activate the first power source circuit;
      input the first voltage to the third power source circuit; and
      supply the operation voltage converted by the third power source circuit to the first unit group, and
   wherein, in the second mode, the control unit is operable to:
      control the power switching unit to activate the second power source circuit and to deactivate the first power source circuit; and
      supply the second voltage output from the second power source circuit to the second unit group without intervention of the third power source circuit.

2. The image forming apparatus according to claim 1, wherein, when the mode switching unit selects the second mode, the control unit is operable to:
   control the power switching unit to activate the second power source circuit such that the second voltage is supplied from the second power source circuit to the first unit group; and
   thereafter control the power switching unit to deactivate the first power source circuit.

3. The image forming apparatus according to claim 1, wherein, in the first mode, the control unit deactivates the second power source circuit.

4. The image forming apparatus according to claim 3, wherein, when the mode switching unit switches the power mode between the first mode and the second mode, the control unit controls the power switching unit to switch the first power source circuit and the second power source circuit at different timings, so as to provide a period for which both of the first power source circuit and the second power source circuit are activated.

5. The image forming apparatus according to claim 4, wherein, when the mode switching unit switches the power mode from the second mode to the first mode, the control unit is operable to:
   control the power switching unit to activate the first power source circuit such that the operation voltages are supplied from the third power source circuit to the first group unit; and
   thereafter deactivate the second power source circuit.

6. The image forming apparatus according to claim 1,
wherein, when the mode switching unit switches the power mode from the second mode to the first mode, the control unit is operable to:
control the power switching unit to activate the first power source circuit;
input the first voltage output from the first power circuit to the third power source circuit;
supply the operation voltage converted by the third power source circuit to the first unit group; and
thereafter control the power switching unit to deactivate the second power source circuit.

7. The image forming apparatus according to claim 1,
wherein the first unit group includes the second unit group,
wherein the third power source circuit is connectable to the second unit group and configured to generate an operation voltage for the second group which is equal to or substantially equal to the second voltage.

8. The image forming apparatus according to claim 7, further comprising:
a first switch configured to open and close an input of the third power source circuit; and
a second switch configured to selectively open and close an output of the third power source circuit to the second unit group,
wherein both of the first switch and the second switch are closed in the first mode and are opened in the second mode,
wherein, when the mode switching unit switches the operation mode between the first mode and the second mode, the control unit switches the first switch and the second switch at different timings, so as to provide a period for which the first switch is closed and the second switch is opened.

9. The image forming apparatus according to claim 8,
wherein, when the mode switching unit switches the power mode from the first mode to the second mode, the control unit is operable to:
open the second switch so as to prevent an output of the operation voltage from the third power source circuit to the second unit group; and
thereafter open the first switch so as to prevent an input of the first voltage from the first power source circuit to the third power source circuit.

10. The image forming apparatus according to claim 8,
wherein, when the mode switching unit switches the power mode from the second mode to the first mode, the control unit is operable to:
close the first switch so as to input the first voltage output from the first power source circuit to the third power source circuit; and
thereafter close the second switch so as to supply the operation voltage output from the third power source circuit to the second unit group.

11. The image forming apparatus according to claim 1,
wherein the first power source circuit and the second power source circuit are provided outside the board;
wherein said image forming apparatus further comprising:
a first connection portion connected to the board; and
a second connection portion connected to the board; and
a third switch configured to select one or both of the first connection portion and the second connection portion through which the first voltage output from the first power source circuit or the second voltage output from the second power source circuit is supplied to the board.

12. The image forming apparatus according to claim 11, further comprising:
a fourth switch configured to select one of the third power source circuit and the second unit group to which a voltage input from the second connection portion is supplied.

13. The image forming apparatus according to claim 12,
wherein, when the mode switching unit switches the power mode from the second mode to the first mode, the control unit is operable to:
supply the first voltage output from the first power source circuit to the board through the first connection portion;
supply the operation voltage output from the third power source circuit to the second unit group;
deactivate the second power source circuit;
control the fourth switch to allow a voltage input from the second connection portion to be applied to the third power source circuit; and
control the third switch to supply the first voltage output from the first power source circuit to the board through the first connection portion and the second connection portion.

14. The image forming apparatus according to claim 11,
wherein, in the first mode, the third switch selects the first connection portion and the second connection portion through which the first voltage output from the first power source circuit is supplied to the board.

15. The image forming apparatus according to claim 12,
wherein, in the second mode, the third switch selects the second connection portion through which the second voltage output from the second power source circuit is supplied to the board.

16. The image forming apparatus according to claim 1, wherein the first unit group includes all of the plurality of functional units.

17. The image forming apparatus according to claim 1, wherein the second unit group includes only a part of the plurality of functional units.

* * * * *